(12) United States Patent
Jibert et al.

(10) Patent No.: US 11,000,791 B2
(45) Date of Patent: May 11, 2021

(54) ROTARY DISC FILTER HAVING BACKWASH GUIDES

(71) Applicant: Veolia Water Solutions & Technologies Support, Saint-Maurice (FR)

(72) Inventors: Johan Gustav Alexander Jibert, Oxie (SE); Emil Svensson, Trelleborg (SE); Filip Thysell, Trelleborg (SE); Per Larsson, Trelleborg (SE)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 315 days.

(21) Appl. No.: 16/293,772

(22) Filed: Mar. 6, 2019

(65) Prior Publication Data
US 2020/0282345 A1   Sep. 10, 2020

(51) Int. Cl.
| | |
|---|---|
| *B01D 33/76* | (2006.01) |
| *B01D 33/00* | (2006.01) |
| *B01D 33/50* | (2006.01) |
| *C02F 1/00* | (2006.01) |
| *B01D 33/21* | (2006.01) |
| *B01D 33/23* | (2006.01) |
| *B01D 33/46* | (2006.01) |

(52) U.S. Cl.
CPC ......... *B01D 33/76* (2013.01); *B01D 33/0009* (2013.01); *B01D 33/0074* (2013.01); *B01D 33/21* (2013.01); *B01D 33/23* (2013.01); *B01D 33/463* (2013.01); *B01D 33/50* (2013.01); *C02F 1/004* (2013.01); *B01D 2201/084* (2013.01)

(58) Field of Classification Search
None
See application file for complete search history.

(56) References Cited

U.S. PATENT DOCUMENTS

| | | | | |
|---|---|---|---|---|
| 424,303 | A * | 3/1890 | Jensen | B01D 33/21 |
| | | | | 210/327 |
| 920,739 | A * | 5/1909 | Hedges et al. | B01D 33/23 |
| | | | | 210/331 |
| 1,017,476 | A * | 2/1912 | Singer | B01D 33/21 |
| | | | | 210/395 |
| 1,036,174 | A * | 8/1912 | Barnes | B01D 33/23 |
| | | | | 210/331 |
| 1,042,295 | A * | 10/1912 | Trent | B01D 33/21 |
| | | | | 210/327 |

(Continued)

FOREIGN PATENT DOCUMENTS

| | | |
|---|---|---|
| EP | 2514500 A1 | 10/2012 |
| KR | 101039326 B1 | 6/2011 |

(Continued)

*Primary Examiner* — Robert J Popovics
(74) *Attorney, Agent, or Firm* — Coats & Bennett PLLC

(57) ABSTRACT

A rotary disc filter includes one or more filter discs secured to a rotary drum and include a series of circumferentially spaced backwash guides disposed in the filter disc. During backwashing, the backwash guides function to engage a mixture of backwash and suspended solids and guide or direct the mixture to a sludge trough disposed in the disc filter. The backwash guides generally assure that a greater percentage of the backwash and suspended solids mixture end up in the solids trough.

25 Claims, 8 Drawing Sheets

(56) References Cited

U.S. PATENT DOCUMENTS

| | | | | | |
|---|---|---|---|---|---|
| 1,057,475 A * | 4/1913 | Young | B01D 33/23 | | |
| | | | 210/331 | | |
| 1,259,139 A * | 3/1918 | Salisbury | B01D 35/16 | | |
| | | | 210/216 | | |
| 1,264,635 A * | 4/1918 | Graham | B01D 33/23 | | |
| | | | 210/331 | | |
| 1,283,925 A * | 11/1918 | Salisbury | B01D 33/21 | | |
| | | | 210/216 | | |
| 1,293,555 A * | 2/1919 | Salisbury | B01D 33/23 | | |
| | | | 210/345 | | |
| 1,336,444 A * | 4/1920 | Salisbury | B01D 35/18 | | |
| | | | 210/771 | | |
| 1,432,134 A * | 10/1922 | Sweetland | B01D 33/21 | | |
| | | | 210/203 | | |
| 1,446,448 A * | 2/1923 | Brown | B01D 33/23 | | |
| | | | 210/216 | | |
| 1,472,098 A * | 10/1923 | Sweetland | B01D 33/23 | | |
| | | | 210/298 | | |
| 1,494,122 A * | 5/1924 | McCaskell | B01D 29/00 | | |
| | | | 210/123 | | |
| 1,502,700 A * | 7/1924 | Vallez | B01D 33/21 | | |
| | | | 210/334 | | |
| 1,510,568 A * | 10/1924 | Sweetland | B01D 33/23 | | |
| | | | 210/327 | | |
| 1,538,980 A * | 5/1925 | Genter | B01D 33/21 | | |
| | | | 210/216 | | |
| 1,649,581 A * | 11/1927 | Gentep | B01D 33/21 | | |
| | | | 210/791 | | |
| 1,685,118 A * | 9/1928 | Campbell | B01D 33/21 | | |
| | | | 127/55 | | |
| 1,700,772 A * | 2/1929 | McCaskell | B01D 33/54 | | |
| | | | 210/785 | | |
| 1,726,035 A * | 8/1929 | Bomonti | B01D 25/02 | | |
| | | | 210/486 | | |
| 1,734,652 A * | 11/1929 | Sweetland | B01D 33/23 | | |
| | | | 210/331 | | |
| 1,746,409 A * | 2/1930 | Sweetland | B01D 33/82 | | |
| | | | 210/331 | | |
| 1,757,355 A * | 5/1930 | Benjamin | B01D 33/466 | | |
| | | | 210/331 | | |
| 1,768,167 A * | 6/1930 | Sweetland | B01D 33/23 | | |
| | | | 210/236 | | |
| 1,774,044 A * | 8/1930 | Sweetland | B01D 33/807 | | |
| | | | 210/780 | | |
| 1,781,652 A * | 11/1930 | Ryley | B01D 33/21 | | |
| | | | 210/384 | | |
| 1,784,372 A * | 12/1930 | McCaskell | B01D 29/23 | | |
| | | | 210/113 | | |
| 1,785,237 A * | 12/1930 | Zenthoefer | B01D 33/465 | | |
| | | | 210/386 | | |
| 1,796,492 A * | 3/1931 | Sweetland | B01D 33/76 | | |
| | | | 210/327 | | |
| 1,803,380 A * | 5/1931 | Campbell | B01D 33/21 | | |
| | | | 127/55 | | |
| 1,804,934 A * | 5/1931 | Hoyt | B01D 33/21 | | |
| | | | 210/327 | | |
| 1,813,073 A * | 7/1931 | Naugle | B01D 33/21 | | |
| | | | 210/461 | | |
| 1,857,810 A * | 5/1932 | Gee | B01D 33/60 | | |
| | | | 208/31 | | |
| 1,859,295 A * | 5/1932 | French | B01D 33/466 | | |
| | | | 210/193 | | |
| 1,860,937 A * | 5/1932 | McCaskell | B01D 35/16 | | |
| | | | 210/230 | | |
| 1,871,207 A * | 8/1932 | Whitman | B01D 35/18 | | |
| | | | 210/768 | | |
| 1,871,878 A * | 8/1932 | Bacheldor | B01D 33/21 | | |
| | | | 210/193 | | |
| 1,874,972 A * | 8/1932 | Hall | B01D 33/21 | | |
| | | | 208/38 | | |
| 1,887,798 A * | 11/1932 | Bryant | B01D 33/466 | | |
| | | | 210/331 | | |
| RE19,359 E * | 11/1934 | Armstrong | B01D 25/215 | | |
| | | | 210/494.1 | | |
| 2,022,069 A * | 11/1935 | Whitmore | B01D 33/21 | | |
| | | | 210/784 | | |
| 2,022,403 A * | 11/1935 | Chapman | B01D 33/21 | | |
| | | | 210/95 | | |
| 2,038,921 A * | 4/1936 | Blaufuss | B01D 33/466 | | |
| | | | 210/397 | | |
| 2,073,026 A * | 3/1937 | Bond | B01D 33/23 | | |
| | | | 210/107 | | |
| 2,079,755 A * | 5/1937 | Wood | B01D 29/41 | | |
| | | | 210/236 | | |
| 2,207,618 A * | 7/1940 | Feldstein | B01D 33/463 | | |
| | | | 210/93 | | |
| 2,269,725 A * | 1/1942 | Malanowski | B01D 33/466 | | |
| | | | 210/327 | | |
| 2,338,549 A * | 1/1944 | Shriver | B01D 33/23 | | |
| | | | 210/486 | | |
| 2,362,231 A * | 11/1944 | Ackerly, Jr. | B01D 33/23 | | |
| | | | 210/399 | | |
| 2,395,225 A * | 2/1946 | Kurz | B01D 33/23 | | |
| | | | 210/486 | | |
| 2,406,065 A * | 8/1946 | Dickinson | C10G 73/025 | | |
| | | | 210/95 | | |
| 2,434,807 A * | 1/1948 | Little | B01D 33/23 | | |
| | | | 210/331 | | |
| 2,459,082 A * | 1/1949 | McCaskell | B01D 33/37 | | |
| | | | 210/110 | | |
| 2,460,280 A * | 2/1949 | Finney | B01D 33/466 | | |
| | | | 210/327 | | |
| 2,464,223 A * | 3/1949 | Genter | B01D 33/23 | | |
| | | | 210/331 | | |
| 2,565,388 A * | 8/1951 | McCaskell | B01D 33/806 | | |
| | | | 210/216 | | |
| 2,591,720 A * | 4/1952 | Peterson | B01D 33/23 | | |
| | | | 210/461 | | |
| 2,592,972 A * | 4/1952 | Strassheim | B01D 29/41 | | |
| | | | 210/107 | | |
| 2,593,707 A * | 4/1952 | Walker | B01D 33/21 | | |
| | | | 210/359 | | |
| 2,655,265 A * | 10/1953 | Little | B01D 33/21 | | |
| | | | 210/398 | | |
| 2,696,916 A * | 12/1954 | Peterson | B01D 33/21 | | |
| | | | 210/236 | | |
| 2,699,872 A * | 1/1955 | Kelsey | B01D 33/72 | | |
| | | | 210/383 | | |
| 2,799,397 A * | 7/1957 | Berline | B01D 33/461 | | |
| | | | 210/331 | | |
| 2,885,083 A * | 5/1959 | Peterson | B01D 33/466 | | |
| | | | 210/396 | | |
| 2,894,632 A * | 7/1959 | Myers | B01D 33/23 | | |
| | | | 210/331 | | |
| 2,899,066 A * | 8/1959 | Peterson | B01D 33/68 | | |
| | | | 210/383 | | |
| 2,902,841 A * | 9/1959 | Little | B01D 33/801 | | |
| | | | 464/177 | | |
| 2,932,402 A * | 4/1960 | Logne | B01D 33/21 | | |
| | | | 210/383 | | |
| 2,946,448 A * | 7/1960 | Peterson | D21D 5/06 | | |
| | | | 210/331 | | |
| 2,964,194 A * | 12/1960 | Oliver, Jr. | B01D 33/23 | | |
| | | | 210/486 | | |
| 2,974,802 A * | 3/1961 | Morehouse | B01D 33/466 | | |
| | | | 210/396 | | |
| 3,061,477 A * | 10/1962 | Lavallee | B01D 33/82 | | |
| | | | 127/9 | | |
| 3,064,817 A * | 11/1962 | Van Der Werff | B01D 33/23 | | |
| | | | 210/232 | | |
| 3,080,064 A * | 3/1963 | Giesse | B01D 33/48 | | |
| | | | 210/396 | | |
| 3,080,597 A * | 3/1963 | Peterson | B01D 29/6476 | | |
| | | | 15/256.5 | | |
| 3,096,278 A * | 7/1963 | Francom | B01D 33/68 | | |
| | | | 210/327 | | |
| 3,137,652 A * | 6/1964 | Graue | B01D 33/21 | | |
| | | | 210/331 | | |

(56) References Cited

U.S. PATENT DOCUMENTS

| | | | | |
|---|---|---|---|---|
| 3,163,601 A * | 12/1964 | Wennberg | B01D 33/466 | 210/196 |
| 3,187,898 A * | 6/1965 | Baker | B01D 37/02 | 210/331 |
| 3,190,449 A * | 6/1965 | Muller | B01D 29/41 | 210/173 |
| 3,193,105 A * | 7/1965 | Putnam | B01D 33/463 | 210/331 |
| 3,221,887 A * | 12/1965 | Schade | B01D 33/463 | 210/327 |
| 3,245,538 A * | 4/1966 | Leonard, III | B01D 33/21 | 210/179 |
| 3,251,468 A * | 5/1966 | Muller | B01D 29/90 | 210/772 |
| 3,251,469 A * | 5/1966 | Muller | B01D 29/41 | 210/771 |
| 3,252,577 A * | 5/1966 | Anderson | B01D 29/41 | 210/236 |
| 3,270,885 A * | 9/1966 | Anderson | B01D 33/21 | 210/112 |
| 3,270,888 A * | 9/1966 | Anderson | B01D 33/21 | 210/327 |
| 3,283,906 A * | 11/1966 | Crane | B01D 33/76 | 210/232 |
| 3,285,417 A * | 11/1966 | Schmidt, Jr. | B01D 29/96 | 210/777 |
| 3,291,312 A * | 12/1966 | Peterson | B01D 33/23 | 210/345 |
| 3,317,050 A * | 5/1967 | Daman | B01D 33/68 | 210/331 |
| 3,322,277 A * | 5/1967 | Pearson, Jr. | B01D 33/801 | 210/739 |
| 3,331,512 A * | 7/1967 | Vore | B01D 33/463 | 210/487 |
| 3,361,259 A * | 1/1968 | Von Der Gathen | B01D 33/073 | 210/771 |
| 3,371,791 A * | 3/1968 | Schryver | B01D 33/21 | 210/327 |
| 3,409,134 A * | 11/1968 | Wallace | B01D 33/21 | 210/777 |
| 3,455,821 A * | 7/1969 | Aremaa | B01D 29/6446 | 210/414 |
| 3,471,026 A * | 10/1969 | Riker | B01D 33/82 | 210/327 |
| 3,473,669 A * | 10/1969 | Davis | B01D 33/23 | 210/486 |
| 3,485,376 A * | 12/1969 | Peterson | B01D 33/23 | 210/331 |
| 3,591,009 A * | 7/1971 | Luthi | B01D 33/742 | 210/247 |
| 3,610,419 A * | 10/1971 | Vallee | D21D 5/02 | 210/326 |
| 3,643,803 A * | 2/1972 | Glos, II | B01D 33/23 | 210/232 |
| 3,692,181 A * | 9/1972 | Davis | B01D 33/23 | 210/331 |
| 3,698,556 A * | 10/1972 | Emmett, Jr. | B01D 33/64 | 210/178 |
| 3,948,779 A * | 4/1976 | Jackson | B01D 33/23 | 210/331 |
| 3,960,726 A * | 6/1976 | Peterson | B01D 36/00 | 210/744 |
| 3,971,722 A * | 7/1976 | Radford | B01D 33/23 | 210/486 |
| 4,017,399 A * | 4/1977 | Lopker | B01D 37/00 | 210/408 |
| 4,032,442 A * | 6/1977 | Peterson | B01D 46/26 | 210/780 |
| 4,056,473 A * | 11/1977 | Nilsson | D21C 9/18 | 210/331 |
| 4,075,103 A * | 2/1978 | Kane | B01D 33/803 | 210/331 |
| 4,077,887 A * | 3/1978 | Langvik | B01D 33/23 | 210/331 |
| 4,086,168 A * | 4/1978 | Moore | B01D 33/15 | 210/330 |
| 4,123,363 A * | 10/1978 | Koskinen | B01D 33/21 | 210/331 |
| 4,131,548 A * | 12/1978 | Peterson | B01D 33/21 | 210/331 |
| 4,134,835 A * | 1/1979 | Solum | B01D 33/23 | 210/178 |
| 4,136,028 A * | 1/1979 | Toivonen | B01D 33/463 | 210/780 |
| 4,138,338 A * | 2/1979 | Velinsky | B01D 33/21 | 210/327 |
| 4,139,472 A * | 2/1979 | Simonson | B01D 33/23 | 210/232 |
| 4,152,267 A * | 5/1979 | Davis | B01D 33/23 | 210/331 |
| 4,159,951 A * | 7/1979 | Davis | B01D 33/23 | 210/331 |
| 4,162,982 A * | 7/1979 | Chesner | B01D 33/23 | 210/331 |
| 4,179,378 A * | 12/1979 | Borre | B01D 33/23 | 210/232 |
| 4,180,461 A * | 12/1979 | Langvik | B01D 33/21 | 210/333.1 |
| 4,203,846 A * | 5/1980 | Barthelemy | B01D 33/23 | 210/331 |
| 4,207,190 A * | 6/1980 | Sheaffer | B01D 33/21 | 210/232 |
| 4,216,093 A * | 8/1980 | Kane | B01D 33/23 | 210/247 |
| 4,220,537 A * | 9/1980 | Takahashi | B01D 33/21 | 210/333.1 |
| 4,255,264 A * | 3/1981 | Madsen | B01D 33/09 | 210/404 |
| 4,268,385 A * | 5/1981 | Yoshikawa | C02F 3/082 | 210/150 |
| 4,279,749 A * | 7/1981 | Moore | B01D 33/76 | 210/330 |
| 4,293,411 A * | 10/1981 | Davis | B01D 33/23 | 210/178 |
| 4,305,820 A * | 12/1981 | Stahl | B01D 25/38 | 210/327 |
| 4,321,140 A * | 3/1982 | Luthi | B30B 9/202 | 210/327 |
| 4,330,405 A * | 5/1982 | Davis | B01D 33/23 | 210/331 |
| 4,578,192 A * | 3/1986 | Muller | B01D 33/23 | 210/486 |
| 4,626,351 A * | 12/1986 | Fuhring | B01D 33/68 | 210/331 |
| 4,637,876 A * | 1/1987 | Dosoudil | B01D 33/23 | 210/331 |
| 4,639,315 A * | 1/1987 | Fuchs | B01D 33/21 | 210/333.1 |
| 4,648,970 A * | 3/1987 | Hermansson | B01D 33/23 | 210/327 |
| 4,655,920 A * | 4/1987 | Ragnegard | B01D 33/23 | 210/331 |
| 4,676,901 A * | 6/1987 | Ragnegard | B01D 33/74 | 210/331 |
| 4,678,574 A * | 7/1987 | Niiranen | B01D 33/804 | 210/327 |
| 4,678,575 A * | 7/1987 | Frykhult | B01D 33/23 | 210/327 |
| 4,686,040 A * | 8/1987 | Nilsson | B01D 33/23 | 210/331 |
| 4,695,381 A * | 9/1987 | Ragnegard | B01D 33/463 | 210/403 |
| 4,699,716 A * | 10/1987 | Barra | B01D 33/23 | 210/486 |
| 4,704,206 A * | 11/1987 | Barra | B01D 33/21 | 210/331 |

(56) References Cited

U.S. PATENT DOCUMENTS

| | | | | |
|---|---|---|---|---|
| 4,707,258 A * | 11/1987 | Drori | B01D 25/34 | 210/333.1 |
| 4,710,294 A * | 12/1987 | Ziller | B01D 33/17 | 210/232 |
| 4,728,424 A * | 3/1988 | Miura | B01D 29/39 | 210/331 |
| 4,781,835 A * | 11/1988 | Bahr | B01D 33/23 | 210/331 |
| 4,814,093 A * | 3/1989 | Frykhult | B01D 33/21 | 210/780 |
| 4,818,401 A * | 4/1989 | Lawrence | B01D 33/21 | 210/330 |
| 4,822,486 A * | 4/1989 | Wilkins | B01D 33/067 | 210/170.09 |
| 4,856,204 A * | 8/1989 | Hindstrom | B01D 39/2075 | 34/95 |
| 4,863,656 A * | 9/1989 | Hindstrom | B01D 39/2075 | 264/602 |
| 4,889,625 A * | 12/1989 | Nilsson | B01D 33/50 | 210/331 |
| 4,897,192 A * | 1/1990 | Lawrence | B01D 33/21 | 210/330 |
| 4,925,557 A * | 5/1990 | Ahlberg, Jr. | B01D 33/23 | 210/321.68 |
| 4,929,355 A * | 5/1990 | Ragnegård | B01D 33/19 | 210/784 |
| 4,931,179 A * | 6/1990 | Nilsson | B01D 33/23 | 210/331 |
| 4,935,136 A * | 6/1990 | Drori | B01D 25/327 | 210/333.1 |
| 4,936,992 A * | 6/1990 | Nilsson | B01D 33/215 | 210/331 |
| 4,943,372 A * | 7/1990 | Kohonen | B01D 33/21 | 210/324 |
| 4,946,602 A * | 8/1990 | Ekberg | B01D 33/21 | 210/785 |
| 4,950,403 A * | 8/1990 | Hauff | D21D 5/046 | 210/486 |
| 4,956,088 A * | 9/1990 | Hindstrom | B01D 33/21 | 210/327 |
| 4,975,189 A * | 12/1990 | Liszka | B01D 33/21 | 210/327 |
| 4,995,991 A * | 2/1991 | Ljokkoi | D21D 5/046 | 210/145 |
| 5,032,270 A * | 7/1991 | Nilsson | B01D 33/463 | 210/331 |
| 5,037,562 A * | 8/1991 | Tarves, Jr. | B01D 61/14 | 210/780 |
| 5,039,347 A * | 8/1991 | Hindstrom | B01D 33/21 | 134/1 |
| 5,053,123 A * | 10/1991 | Clarke-Pounder | B01D 33/82 | 210/138 |
| 5,124,029 A * | 6/1992 | Fjallstrom | B01D 33/15 | 209/250 |
| 5,227,064 A * | 7/1993 | Strid | B01D 33/66 | 210/327 |
| 5,242,590 A * | 9/1993 | Thomson | B01D 33/803 | 210/331 |
| 5,254,250 A * | 10/1993 | Rolchigo | B01D 35/06 | 210/321.67 |
| 5,258,120 A * | 11/1993 | Knodel | B01D 33/23 | 210/232 |
| 5,269,945 A * | 12/1993 | Holmberg | B01D 33/11 | 210/744 |
| 5,273,651 A * | 12/1993 | Nilsson | B01D 33/215 | 210/331 |
| 5,296,143 A * | 3/1994 | Frykhult | B01D 29/014 | 210/331 |
| 5,304,304 A * | 4/1994 | Jakobson | B01D 33/463 | 210/331 |
| 5,316,675 A * | 5/1994 | Frykhult | B01D 33/807 | 210/327 |
| 5,330,646 A * | 7/1994 | Frykhult | B01D 33/23 | 210/331 |
| 5,344,575 A * | 9/1994 | Boulet | B01D 33/763 | 210/780 |
| 5,362,401 A * | 11/1994 | Whetsei | B01D 33/807 | 210/741 |
| 5,374,360 A * | 12/1994 | Weis | B01D 33/463 | 210/780 |
| 5,389,256 A * | 2/1995 | McEwen | B01D 29/114 | 210/346 |
| 5,503,737 A * | 4/1996 | Luthi | B01D 33/82 | 210/138 |
| 5,540,846 A * | 7/1996 | Koch | B01D 35/31 | 210/741 |
| 5,615,494 A * | 4/1997 | Ekberg | B01D 33/21 | 34/585 |
| 5,618,422 A * | 4/1997 | Pelkio | B01D 33/23 | 210/323.1 |
| 5,620,598 A * | 4/1997 | Strid | B01D 33/21 | 210/324 |
| 5,635,062 A * | 6/1997 | Cameron | B01D 33/23 | 210/232 |
| 5,637,213 A * | 6/1997 | McEwen | B01D 29/114 | 210/232 |
| 5,641,402 A * | 6/1997 | Kohonen | B01D 33/21 | 210/330 |
| 5,653,816 A * | 8/1997 | Ekberg | B01D 33/21 | 134/1 |
| 5,656,162 A * | 8/1997 | Nilsson | B01D 33/067 | 210/236 |
| 5,692,619 A * | 12/1997 | Haeffner | B01D 33/23 | 209/271 |
| 5,705,068 A * | 1/1998 | Lukkarinen | B01D 33/21 | 210/331 |
| 5,707,512 A * | 1/1998 | Koch | B01D 33/663 | 210/136 |
| 5,759,397 A * | 6/1998 | Larsson | B01D 33/073 | 210/331 |
| 5,792,352 A * | 8/1998 | Scheucher | B01D 33/23 | 210/331 |
| 5,804,071 A * | 9/1998 | Haeffner | B01D 33/11 | 210/393 |
| 5,820,756 A * | 10/1998 | McEwen | B01D 29/39 | 210/486 |
| 5,849,202 A * | 12/1998 | Koch | B01D 29/90 | 210/780 |
| 5,855,799 A * | 1/1999 | Herrmann | B01D 33/21 | 210/780 |
| 5,876,612 A * | 3/1999 | Astrom | B01D 29/606 | 210/741 |
| 5,893,972 A * | 4/1999 | Peterson | B01D 33/23 | 210/331 |
| 5,900,158 A * | 5/1999 | Ruokolainen | B01D 33/463 | 210/772 |
| 5,914,048 A * | 6/1999 | Chase | B01D 33/82 | 210/741 |
| 5,925,248 A * | 7/1999 | Moore | B01D 33/23 | 210/331 |
| 5,951,878 A * | 9/1999 | Astrom | B01D 33/21 | 210/791 |
| 6,063,294 A * | 5/2000 | Martensson | B01D 33/804 | 210/739 |
| 6,079,120 A * | 6/2000 | Ekberg | B01D 33/21 | 34/401 |
| 6,090,298 A * | 7/2000 | Weis | B01D 33/503 | 210/780 |
| 6,096,198 A * | 8/2000 | Underhill | B01D 17/0202 | 210/123 |
| 6,103,132 A * | 8/2000 | Seyfried | B01D 33/073 | 210/791 |
| 6,110,374 A * | 8/2000 | Hughes | B01D 39/16 | 210/638 |
| 6,110,386 A * | 8/2000 | Underhill | B01D 17/0202 | 210/744 |
| 6,113,783 A * | 9/2000 | Strid | B01D 33/23 | 210/331 |

(56) References Cited

U.S. PATENT DOCUMENTS

| | | | | |
|---|---|---|---|---|
| 6,217,782 B1* | 4/2001 | Tuori | B01D 33/54 | 210/785 |
| 6,231,761 B1 | 5/2001 | Mohlin et al. | | |
| 6,258,282 B1* | 7/2001 | Strid | B01D 33/21 | 210/780 |
| 6,283,306 B1* | 9/2001 | Nilsson | B01D 33/21 | 210/391 |
| 6,284,136 B1* | 9/2001 | Tuori | B01D 29/114 | 210/331 |
| 6,294,098 B1* | 9/2001 | Bergmann | B01D 33/503 | 210/791 |
| 6,447,617 B1* | 9/2002 | Bergmann | B01D 33/463 | 134/32 |
| 6,454,940 B1* | 9/2002 | Walters | B01D 29/413 | 210/232 |
| 6,500,331 B2* | 12/2002 | Massignani | B01D 33/15 | 210/155 |
| 6,596,166 B1* | 7/2003 | Danielsson | B01D 33/463 | 210/324 |
| 6,773,585 B1* | 8/2004 | Troubounis | B01D 33/073 | 210/221.2 |
| 6,793,809 B2* | 9/2004 | Ingelman | B01D 33/463 | 210/143 |
| D497,660 S* | 10/2004 | Danielsson | B01D 33/23 | D23/209 |
| 6,833,077 B2* | 12/2004 | Flanagan | B01D 33/804 | 210/772 |
| 7,005,067 B2* | 2/2006 | Flanagan | B01D 33/21 | 210/248 |
| 7,314,556 B2* | 1/2008 | Sheets | B01D 33/23 | 210/331 |
| 7,410,569 B1* | 8/2008 | Tilev | B01D 21/0012 | 210/167.02 |
| 7,556,156 B2* | 7/2009 | Lovizzaro | B01D 33/23 | 210/486 |
| 7,597,805 B2* | 10/2009 | Danielsson | B01D 33/21 | 210/232 |
| 7,686,964 B2* | 3/2010 | Lownertz | D21C 11/0064 | 210/772 |
| 7,892,424 B2* | 2/2011 | Mayrand | C02F 3/1242 | 210/151 |
| 7,972,508 B2* | 7/2011 | Danielsson | B01D 33/23 | 210/232 |
| 8,002,994 B2* | 8/2011 | Engdahl | D21C 11/00 | 210/768 |
| 8,101,090 B2* | 1/2012 | Ralvert | B01D 33/50 | 210/797 |
| 8,118,175 B2* | 2/2012 | Davis | B01D 33/70 | 210/404 |
| 8,197,201 B2* | 6/2012 | Mayrand | C02F 3/082 | 415/202 |
| 8,409,436 B2* | 4/2013 | Danielsson | B01D 33/23 | 210/232 |
| 8,414,769 B2* | 4/2013 | Servo | B01D 33/23 | 210/331 |
| 8,444,862 B2* | 5/2013 | Ralvert | B01D 33/50 | 210/780 |
| 8,518,273 B2* | 8/2013 | Lownertz | D21C 11/0064 | 210/791 |
| 8,585,898 B2* | 11/2013 | Gaudfrin | B01D 33/21 | 210/331 |
| 8,628,661 B2* | 1/2014 | Gaudfrin | B01D 33/803 | 210/232 |
| 8,801,929 B2* | 8/2014 | Davis | B01D 29/012 | 210/331 |
| 8,808,542 B2* | 8/2014 | Davis | B01D 33/11 | 210/331 |
| 8,852,434 B2* | 10/2014 | Larsson | B01D 33/23 | 210/331 |
| 8,864,991 B2* | 10/2014 | Larsson | B01D 33/23 | 210/331 |
| 8,926,843 B2* | 1/2015 | Baker | B01D 33/503 | 210/744 |
| 8,961,785 B2* | 2/2015 | Danielsson | B01D 33/21 | 210/232 |
| 9,023,208 B2* | 5/2015 | Davis | B01D 29/012 | 210/331 |
| 9,028,692 B2* | 5/2015 | Petit | B01D 33/11 | 210/331 |
| 9,238,188 B2* | 1/2016 | Strid | B01D 33/50 |  |
| 9,259,674 B2* | 2/2016 | Hammarberg | B01D 33/466 |  |
| 9,339,745 B2* | 5/2016 | Davis | B01D 33/067 |  |
| 9,364,779 B2* | 6/2016 | Rowe | G01B 5/30 |  |
| 9,468,874 B2* | 10/2016 | Rantala | B01D 33/21 |  |
| 9,555,349 B2* | 1/2017 | Hoefken | B01D 33/15 |  |
| 9,604,162 B2* | 3/2017 | Hoefken | B01D 33/763 |  |
| 9,636,611 B2* | 5/2017 | Luukkanen | B01D 33/21 |  |
| 9,669,338 B2* | 6/2017 | Giasson | B01D 33/21 |  |
| 9,808,747 B2* | 11/2017 | Massignani | B01D 33/466 |  |
| 9,938,159 B2* | 4/2018 | Larsson | B01D 33/21 |  |
| 9,962,635 B2* | 5/2018 | Stewart | B01D 33/50 |  |
| 9,968,875 B2* | 5/2018 | Gabrielsson | B01D 33/23 |  |
| 10,005,213 B2* | 6/2018 | Ralvert | B29C 45/14336 |  |
| 10,011,947 B2* | 7/2018 | Ingelman | D21C 11/04 |  |
| 10,188,971 B2* | 1/2019 | Danielsson | B01D 33/21 |  |
| 10,207,210 B2* | 2/2019 | Petit | B01D 29/012 |  |
| 10,220,335 B2* | 3/2019 | Lee | B01D 33/23 |  |
| 10,286,342 B2* | 5/2019 | Illi | B01D 33/23 |  |
| 10,391,455 B2* | 8/2019 | Liebermann | B01D 65/08 |  |
| 10,589,201 B2* | 3/2020 | Larsson | B01D 33/50 |  |
| 10,729,994 B2* | 8/2020 | Svensson | B01D 33/42 |  |
| 10,800,667 B1* | 10/2020 | Janicki | B01D 19/0068 |  |
| 10,814,282 B2* | 10/2020 | Vanttinen | B01D 63/16 |  |
| 10,857,491 B2* | 12/2020 | Braschi | B01D 33/21 |  |
| 10,888,807 B2* | 1/2021 | Harden | B01D 33/42 |  |
| 10,894,226 B2* | 1/2021 | Niggl | B01D 33/23 |  |
| 10,913,016 B2* | 2/2021 | Lee | B01D 33/23 |  |
| 10,946,318 B2* | 3/2021 | Thysell | B01D 33/21 |  |
| 2001/0017279 A1* | 8/2001 | Massignani | B01D 33/15 | 210/327 |
| 2002/0050283 A1* | 5/2002 | Bergmann | B08B 3/02 | 134/33 |
| 2002/0153296 A1* | 10/2002 | Servo | B01D 33/23 | 210/232 |
| 2002/0166821 A1* | 11/2002 | Flanagan | B01D 33/21 | 210/784 |
| 2002/0166822 A1* | 11/2002 | Flanagan | B01D 33/804 | 210/784 |
| 2003/0106850 A1* | 6/2003 | Arnaut | B01D 63/16 | 210/323.1 |
| 2004/0020838 A1* | 2/2004 | Gabl | B01D 33/21 | 210/232 |
| 2004/0045913 A1* | 3/2004 | Flanagan | B01D 33/21 | 210/780 |
| 2004/0069721 A1* | 4/2004 | Ingelman | D21C 11/04 | 210/767 |
| 2004/0069722 A1* | 4/2004 | Ekberg | B01D 33/21 | 210/770 |
| 2005/0103727 A1* | 5/2005 | Flanagan | B01D 33/463 | 210/772 |
| 2005/0263918 A1* | 12/2005 | Heidenreich | B22F 3/11 | 264/41 |
| 2006/0260999 A1* | 11/2006 | Danielsson | B01D 29/58 | 210/402 |
| 2007/0221345 A1* | 9/2007 | Lownertz | D21C 11/0064 | 162/16 |
| 2007/0251891 A1* | 11/2007 | Lownertz | D21C 11/0064 | 210/791 |
| 2008/0035584 A1* | 2/2008 | Petit | B01D 33/50 | 210/780 |
| 2008/0164222 A1* | 7/2008 | Engdahl | D21C 11/00 | 210/772 |
| 2009/0020483 A1* | 1/2009 | Davis | B01D 33/23 | 210/784 |
| 2009/0020484 A1* | 1/2009 | Davis | B01D 29/012 | 210/784 |
| 2009/0026152 A1* | 1/2009 | Collins | B01D 33/23 | 210/791 |

(56) References Cited

U.S. PATENT DOCUMENTS

| | | | |
|---|---|---|---|
| 2009/0250386 A1* | 10/2009 | Mayrand | C02F 3/082 210/151 |
| 2010/0012570 A1* | 1/2010 | Danielsson | B01D 33/215 210/235 |
| 2010/0032364 A1* | 2/2010 | Servo | B01D 33/23 210/331 |
| 2010/0032388 A1* | 2/2010 | Ralvert | B01D 33/50 210/797 |
| 2010/0126945 A1* | 5/2010 | Patel | C02F 1/705 210/757 |
| 2010/0282659 A1* | 11/2010 | Gaudfrin | B01D 33/803 210/236 |
| 2011/0000834 A1* | 1/2011 | Kindlund | B01D 33/21 210/107 |
| 2011/0001068 A1* | 1/2011 | Kindlund | B01D 37/02 251/4 |
| 2011/0024347 A1* | 2/2011 | Larsson | B01D 33/23 210/331 |
| 2011/0203988 A1* | 8/2011 | Gaudfrin | B01D 33/466 210/413 |
| 2011/0203989 A1* | 8/2011 | Rantala | B01D 33/23 210/483 |
| 2012/0000842 A1* | 1/2012 | Danielsson | B01D 29/58 210/236 |
| 2012/0091065 A1* | 4/2012 | Xia | B01D 29/39 210/702 |
| 2012/0103890 A1* | 5/2012 | Larsson | B01D 33/23 210/236 |
| 2012/0111805 A1* | 5/2012 | Ralvert | B01D 33/50 210/797 |
| 2012/0298573 A1* | 11/2012 | Davis | B01D 29/012 210/404 |
| 2012/0325753 A1* | 12/2012 | Baker | B01D 33/804 210/744 |
| 2013/0043179 A1* | 2/2013 | Bugg | B01D 33/42 210/324 |
| 2013/0105382 A1* | 5/2013 | Strid | B01D 33/21 210/391 |
| 2013/0153486 A1* | 6/2013 | Danielsson | B01D 33/21 210/330 |
| 2013/0175208 A1* | 7/2013 | Madsen | C02F 3/1268 210/151 |
| 2013/0213876 A1* | 8/2013 | Larsson | B01D 33/23 210/332 |
| 2013/0228506 A1* | 9/2013 | Ralvert | B29C 45/1671 210/331 |
| 2013/0256219 A1* | 10/2013 | Oldfield | C02F 3/103 210/608 |
| 2013/0299408 A1* | 11/2013 | Olenberg | B01D 33/463 210/232 |
| 2014/0048474 A1* | 2/2014 | Kuk | B01D 33/21 210/393 |
| 2014/0069876 A1* | 3/2014 | Grace | B01D 33/76 210/780 |
| 2014/0124461 A1* | 5/2014 | Buisson | B01D 33/804 210/780 |
| 2014/0197093 A1* | 7/2014 | Gabrielsson | B01D 33/23 210/485 |
| 2014/0346104 A1* | 11/2014 | Ekberg | B01D 39/2075 210/323.1 |
| 2014/0360950 A1* | 12/2014 | Davis | B01D 33/50 210/784 |
| 2014/0374363 A1* | 12/2014 | Hammarberg | B01D 33/466 210/777 |
| 2015/0008194 A1* | 1/2015 | Davis | B01D 29/012 210/784 |
| 2015/0096945 A1* | 4/2015 | Chen | B01D 29/41 210/780 |
| 2015/0128434 A1* | 5/2015 | Rowe | G01B 5/30 33/533 |
| 2015/0190740 A1* | 7/2015 | Danielsson | B01D 33/23 210/236 |
| 2015/0224429 A1* | 8/2015 | Massignani | B01D 33/466 210/247 |
| 2015/0225895 A1* | 8/2015 | Ingelman | D21C 11/04 162/30.1 |
| 2015/0246302 A1* | 9/2015 | Petit | B01D 33/11 210/780 |
| 2015/0265951 A1* | 9/2015 | Frommann | B01D 33/463 210/323.1 |
| 2015/0290564 A1* | 10/2015 | Hoefken | B01D 33/23 210/331 |
| 2015/0290565 A1* | 10/2015 | Hoefken | B01D 33/15 210/331 |
| 2015/0290566 A1* | 10/2015 | Luukkanen | B01D 33/21 210/797 |
| 2015/0343347 A1* | 12/2015 | Hindstrom | B01D 33/74 210/232 |
| 2016/0038857 A1* | 2/2016 | Rantala | B01D 33/21 210/359 |
| 2016/0045871 A1* | 2/2016 | Liebermann | B01D 33/21 210/321.68 |
| 2016/0074784 A1* | 3/2016 | Illi | B01D 33/21 210/739 |
| 2016/0121244 A1* | 5/2016 | Ylisiurua | B01D 33/803 210/232 |
| 2016/0121245 A1* | 5/2016 | Ekberg | B01D 33/23 210/222 |
| 2016/0129377 A1* | 5/2016 | Stewart | B01D 33/50 210/107 |
| 2016/0129379 A1* | 5/2016 | Maquet | B01D 25/176 210/232 |
| 2016/0193767 A1* | 7/2016 | Ralvert | B29C 55/02 264/257 |
| 2016/0263497 A1* | 9/2016 | Giasson | B01D 33/21 |
| 2017/0043284 A1* | 2/2017 | Petit | C02F 1/004 |
| 2017/0157540 A1* | 6/2017 | Svensson | C02F 1/001 |
| 2017/0165597 A1* | 6/2017 | Kotler | B01D 33/21 |
| 2017/0183818 A1* | 6/2017 | Hammarberg | B01D 33/21 |
| 2017/0232367 A1* | 8/2017 | Giasson | B01D 33/803 29/896.62 |
| 2018/0050291 A1* | 2/2018 | Chen | B01D 33/50 |
| 2018/0147509 A1* | 5/2018 | Braschi | B01D 33/23 |
| 2018/0154291 A1* | 6/2018 | Malo | B01D 33/23 |
| 2018/0178147 A1* | 6/2018 | Thysell | B01D 33/23 |
| 2018/0214800 A1* | 8/2018 | Gabrielsson | D21D 5/04 |
| 2018/0318737 A1* | 11/2018 | Mackel | B01D 33/68 |
| 2018/0326357 A1* | 11/2018 | Vanttinen | B01D 29/15 |
| 2018/0326358 A1* | 11/2018 | Grone | B01D 63/08 |
| 2018/0345184 A1* | 12/2018 | Lee | B01D 33/23 |
| 2018/0369724 A1* | 12/2018 | Oswaldson | B01D 33/466 |
| 2019/0111364 A1* | 4/2019 | Lee | B01D 33/23 |
| 2019/0217227 A1* | 7/2019 | Niggl | B01D 33/23 |
| 2019/0224597 A1* | 7/2019 | Harden | B01D 33/807 |
| 2019/0255468 A1* | 8/2019 | Larsson | B01D 33/11 |
| 2019/0263678 A1* | 8/2019 | Nazzer | B01D 33/21 |
| 2019/0314743 A1* | 10/2019 | Jibert | B01D 33/50 |
| 2020/0009484 A1* | 1/2020 | Uliel | B01D 33/23 |
| 2020/0054974 A1* | 2/2020 | Karaila | B01D 29/002 |
| 2020/0070072 A1* | 3/2020 | Harpin | B01D 33/21 |
| 2020/0282345 A1* | 9/2020 | Jibert | B01D 33/76 |
| 2020/0289962 A1* | 9/2020 | Wang | B01D 33/21 |
| 2020/0324229 A1* | 10/2020 | Antikainen | G01N 29/4427 |
| 2021/0008473 A1* | 1/2021 | Moon | B01D 33/48 |
| 2021/0046407 A1* | 2/2021 | Dedul | B01D 33/463 |

FOREIGN PATENT DOCUMENTS

| | | |
|---|---|---|
| KR | 101339328 B1 | 12/2013 |
| WO | 2018060809 A1 | 4/2018 |

* cited by examiner

ROTARY DISC FILTER HAVING BACKWASH GUIDES

FIELD OF THE INVENTION

The present invention relates to rotary disc filters that filter water or wastewater.

BACKGROUND OF THE INVENTION

Rotary disc filters are designed to filter a liquid, such as water or wastewater, and typically include a drum, a plurality of filter discs secured to the drum, and a backwash system for backwashing filter media forming a part of the filter disc. Liquid to be filtered passes from the drum into the filter disc, which includes the filter media on opposite sides thereof. Liquid in the filter disc flows outwardly through the filter media. In this process, suspended solids in the liquid are captured or retained on the inner surfaces of the filter media. From time-to-time, the filter media is cleaned by a backwashing operation. In the backwashing operation, nozzles disposed exteriorly of the filter disc direct a pressurized backwash through the filter media and into the filter disc. The backwash dislodges the suspended solids retained on the inner surfaces of the filter media. The mixture of backwash and dislodged suspended solids flow by gravity from the filter disc, through openings in the drum, and into a solids trough disposed in the drum.

It is challenging, however, to channel all or substantially all of the suspended solids into the solids trough. An accumulation of suspended solids takes place inside the drum and inside the filter disc. Particles of all sizes accumulate in these areas. The reasons for this accumulation are many. A main reason is that 100% of the solids filtered by the filter media do not end up in the solids trough. Some of the solids fall off the media when breaking through the water surface when the drum and filter disc are rotated in a backwashing operation. Other suspended solids fail to reach the solids trough due to a high incoming water speed or a high rotation speed of the filter disc during backwashing. Further, some of the suspended solids captured or retained on the filter media do not end up in the solids trough. All of this tends to result in an inefficient filtering process.

Therefore, there has been and continues to be a need for a rotary disc filter that is designed to more efficiently collect suspended solids and direct them into the solids trough.

SUMMARY OF THE INVENTION

The present invention entails a rotary disc filter having backwash guides that are designed to guide a backwash and suspended solids mixture through the filter disc and through openings in the inner periphery of the filter disc after which the backwash and suspended solids pass through openings in the drum and into the solids trough disposed in the drum.

In one embodiment, the backwash guides project inwardly from opposite sides of the filter disc and are circumferentially spaced around the filter disc. Backwash guides and the filter media disposed on opposite sides of the filter disc form a series of backwash channels that extend generally between the inner and outer peripheries of the filter disc. Inner end portions of the backwash channels are disposed adjacent openings in the inner periphery of the filter disc. As the filter disc is rotated during the backwashing operation, the backwash channels tend to catch or receive the mixture of backwash and suspended solids and guide the mixture of backwash and suspended solids along the backwash channels and into the openings formed in the inner periphery of the filter disc. Thereafter, the backwash and suspended solids mixture pass through openings in the drum and into the solids trough disposed within the drum.

Other objects and advantages of the present invention will become apparent and obvious from a study of the following description and the accompanying drawings which are merely illustrative of such invention.

DESCRIPTION OF EXEMPLARY EMBODIMENT

Figure 1:
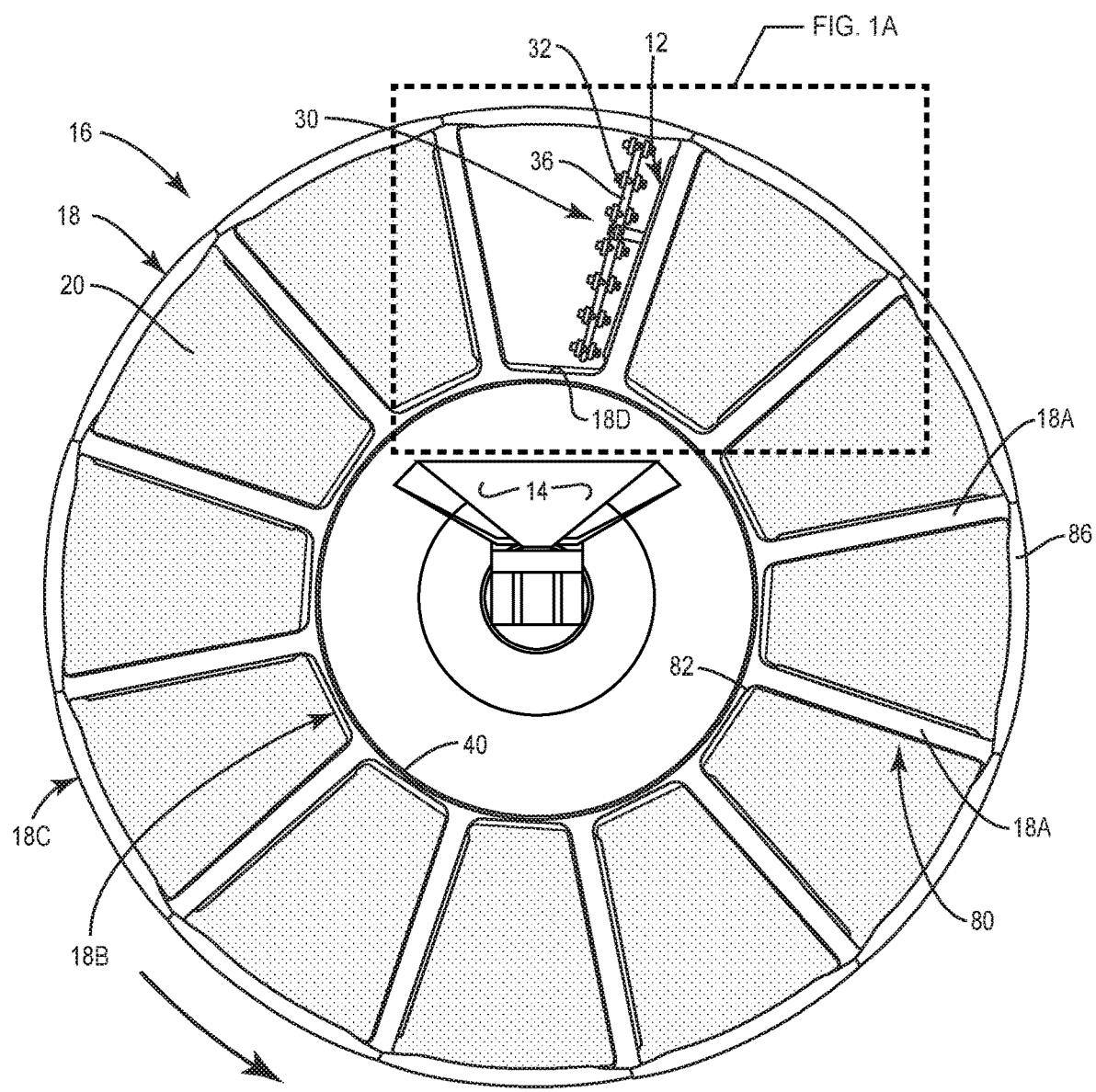
FIG. 1 is a cross-sectional view of a disc filter.

With further reference to the drawings and as discussed above, the present invention relates to a rotary disc filter 10 that is designed to effectively collect suspended solids in a solids trough 14. This is achieved by a series of backwash guides 12 provided in filter discs 16 mounted to a rotary drum 40. See FIGS. 1, 1A and 2. Each filter disc 16 comprises a filter frame 18 and filter segments 20 supported in the filter frame. Filter segments 20 form filter media disposed on opposite sides of the filter disc 16. See FIG. 2. Backwash guides 12 are spaced inwardly from the filter segments 20. This spacing results in the backwash guides 12, filter frame and the filter segments 20 forming backwash channels 22 around the interior of the filter disc 16.

In a backwashing operation, the filter discs 16 and hence the backwash channels 22 are rotated past backwashing nozzles 32 that form a part of the backwashing system 30 and which are disposed on opposite sides of the filter discs 16. Pressurized backwash from the nozzles 32 penetrates the filter segments 20 and enters the filter discs 16, and in the process, suspended solids are dislodged from an inner side of the filter segments 20. Backwash that penetrates the filter segments 20 does not typically continue in the same direction once inside the filter disc 16. The velocity of the backwash on the inner side of the filter segment 20 is relatively low. The backwash which penetrates the filter media tends to run down, by gravity, along the inner sides of the filter media. Expressed in another way, the backwash and suspended solids mixture tends to move by gravity closely adjacent the inner surfaces of the filter segments 20. Backwash channels 22 include open sides that face the direction of rotation of the filter discs 16. As portions of the filter segments 20 move towards and past the backwashing nozzles 32, the backwash channels 22 tend to catch or scoop the mixture of backwash and suspended solids. Since a substantial portion of the backwash and suspended solids mixture moves adjacent the inner surfaces of the filter segments 20, this facilitates the efficient capture of the mixture. Due to the location of the nozzles 32 and the direction of rotation of the filter disc 16, as viewed for example in FIG. 1, the backwash and suspended solids mixture tend to move towards and into oncoming backwash channels 22. Once in the backwash channels 22, the backwash and suspended solids mixture is guided inwardly to and through openings 18D formed in the inner periphery 18B of the filter frame 18. From there, the mixture of backwash and suspended solids passes through openings 40A in the drum 40 and into the solids trough 14 disposed in the drum.

Figure 1A:
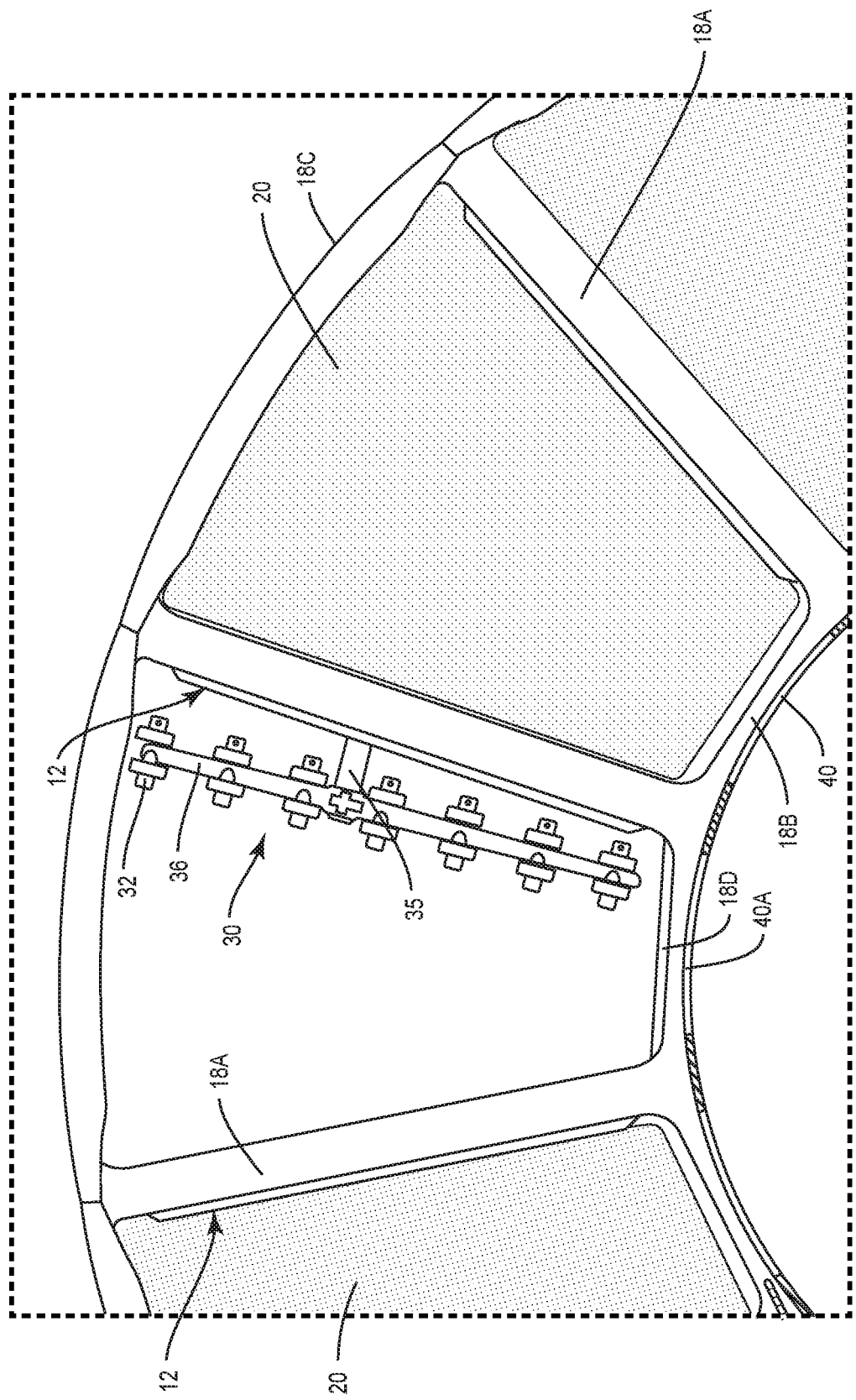
FIG. 1A is an enlarged fragmentary view illustrating a portion of a filter disc that forms a part of the disc filter.

Subsequently, the basic structure and function of the disc filter 10 will be described. But first, the focus is on the filter discs 16 and the backwash guides 12. FIGS. 1 and 1A show a filter disc 16 mounted to the rotary drum 40. Drum 40 includes an array of openings 40A formed in the surface thereof. Each filter disc 16 comprises a filter frame 18 and the filter segments 20 supported in the filter frame. In the embodiment shown in FIG. 1, the filter frame 18 comprises a plurality of circumferentially spaced support arms 18A. Support arms 18A extend between an inner periphery 18B and an outer periphery 18C of the filter frame. Inner periphery 18B of the filter frame 18 also forms the inner periphery of the filter disc 16. Openings 18D are formed in the inner periphery of the filter disc 16. Openings 18D enable water or liquid to flow from the drum 40 into the filter discs 16 during the filtering process. They also allow a mixture of backwash and suspended solids to flow from the filter discs 16 through openings 40D in the drum 40 and into the solids trough 14 disposed in the drum. See FIG. 1.

As noted above, in one embodiment during a backwashing operation, filter discs 16 rotates counterclockwise as viewed in FIG. 1. Backwash guides 12 project from one side of the support arms 18A in the direction of rotation of the filter discs 16. Backwash guides 12 can be integrally formed with the filter frame 18 and particularly with the support arms 18A attached or fastened to a particular filter frame structure or integrally formed with the filter segment 20.

During a backwashing operation, the nozzles 32 are disposed exteriorly of the filter discs 16 and direct a pressurized backwash through the filter segments 20. In the process, suspended solids filtered by the filter segments 20 and retained on the inner side thereof are dislodged. This results in a mixture of backwash and suspended solids in the filter discs 16. The function of the backwash guides 12 and backwash channels 22 is to guide the mixture of backwash and suspended solids out of the filter discs 16 and into the solids trough 14.

Figure 2:
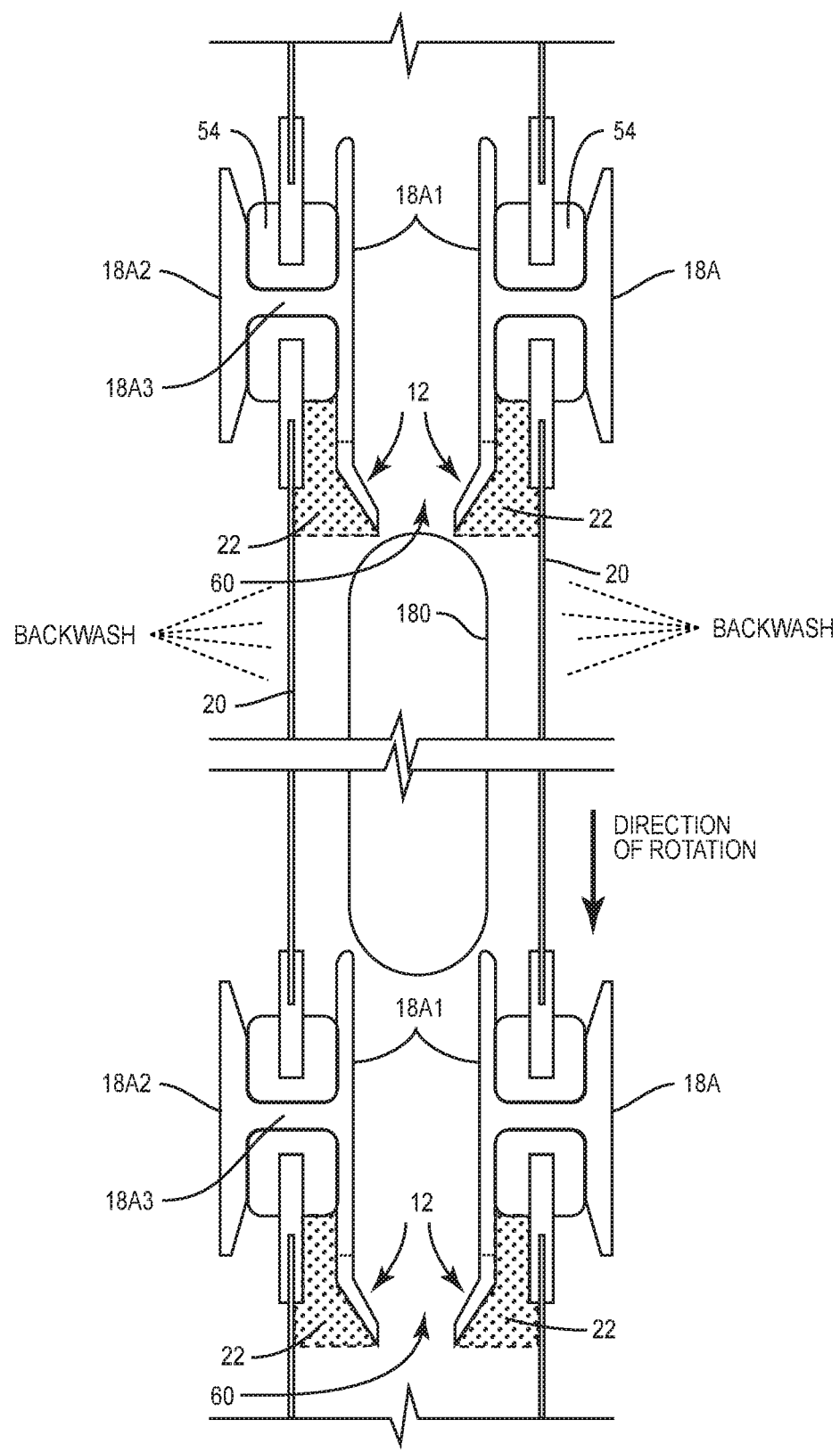
FIG. 2 is a schematic cross-sectional view of a portion of the filter disc particularly illustrating the backwash guides.

To better illustrate the backwash guides 12 and how they facilitate the efficient capture and removal of the backwash and suspended solids mixture, reference is made to FIG. 2. FIG. 2 is a schematic cross-sectional illustration showing a portion of the filter frame 18, filter segments 20 and the backwash guides 12. As noted above, filter frame 18 includes support arms 18A and they are schematically illustrated in FIG. 2. Support arms 18A include an inner portion 18A1, an outer portion 18A2, and a cross portion 18A3. See FIG. 2. Again, this is a schematic illustration and in one embodiment the transversely aligned support arms 18A shown in FIG. 2 can be interconnected. In any event, the support arms 18A form back-to-back grooves that receive and hold seals 54. Filter segments 20 which include a surrounding frame and filter media are in turn received and held in the seals 54.

Continuing to refer to FIG. 2, the backwash guides 12 project from one end of the inner portions 18A1. Again, the backwash guides 12 project in the direction of rotation of the filter discs 16 during backwashing as shown in FIGS. 1 and 2. Note that the backwash guides 12 also project inwardly into the filter disc 16. Further, the backwash guides 12 are circumferentially spaced around the filter disc 16. Backwash guides 12 are arranged in pairs. That is, two backwash guides 12 are transversely aligned and disposed across from each other. See FIG. 2. The backwash guides 12 project slightly towards each other. This forms an open space 60 between each pair of backwash guides 12. This open space enables water or liquid to pass through the open space when the filter discs 16 are rotated.

Backwash guides 12 in one embodiment effectively form an elongated edge that extends between the inner and outer peripheries 18B and 18C of the filter frame 18. Further, the backwash guides 12, along with portions of the support arms 18A, seals 54 and filter segments 20 form the backwash channels 22. See FIG. 2. During a backwashing operation, the backwash channels 22 effectively entrap a mixture of backwash and suspended solids and guide or direct the mixture to openings 18D formed in the inner periphery 18B of the filter frame 18. As noted before, this enables the backwash and suspended solids mixture to pass through the array of openings 40A in the drum 40 and into the underlying solids trough 14.

As noted above, during a backwashing operation, the drum 40 and the filter discs 16 can be rotated. Filter segments 20 are rotated to an upper position on the disc filter 10 where the nozzles 32 are stationed. As the backwash guides 12 approach the nozzles 32 and move past the nozzles, backwash from the nozzles 32 penetrate the filter segments 20 and enter the interior of the filter discs 16. When this happens, the backwash and dislodged suspended solids form a mixture. The backwash guides 12 tend to urge the backwash and suspended solids mixture into the backwash channels 22. The backwash guides 12 and the backwash channels 22 tend to catch or scoop the backwash and suspended solids mixture that ends up inside the filter disc 16. Once in the backwash channels 22, the backwash and suspended solids mixture is directed along the channels 22. Inner portions of the backwash channels 22 terminate adjacent the openings 18D in the inner periphery 18B of the filter frame or filter disc. Thus, the backwash channels 22 effectively guide or direct the backwash and suspended solids mixture into the openings 18D of the filter frame 18. From there, as discussed above, the backwash and suspended solid mixture passes through openings 40A in the drum 40 and into the solids trough 14.

Figure 3:
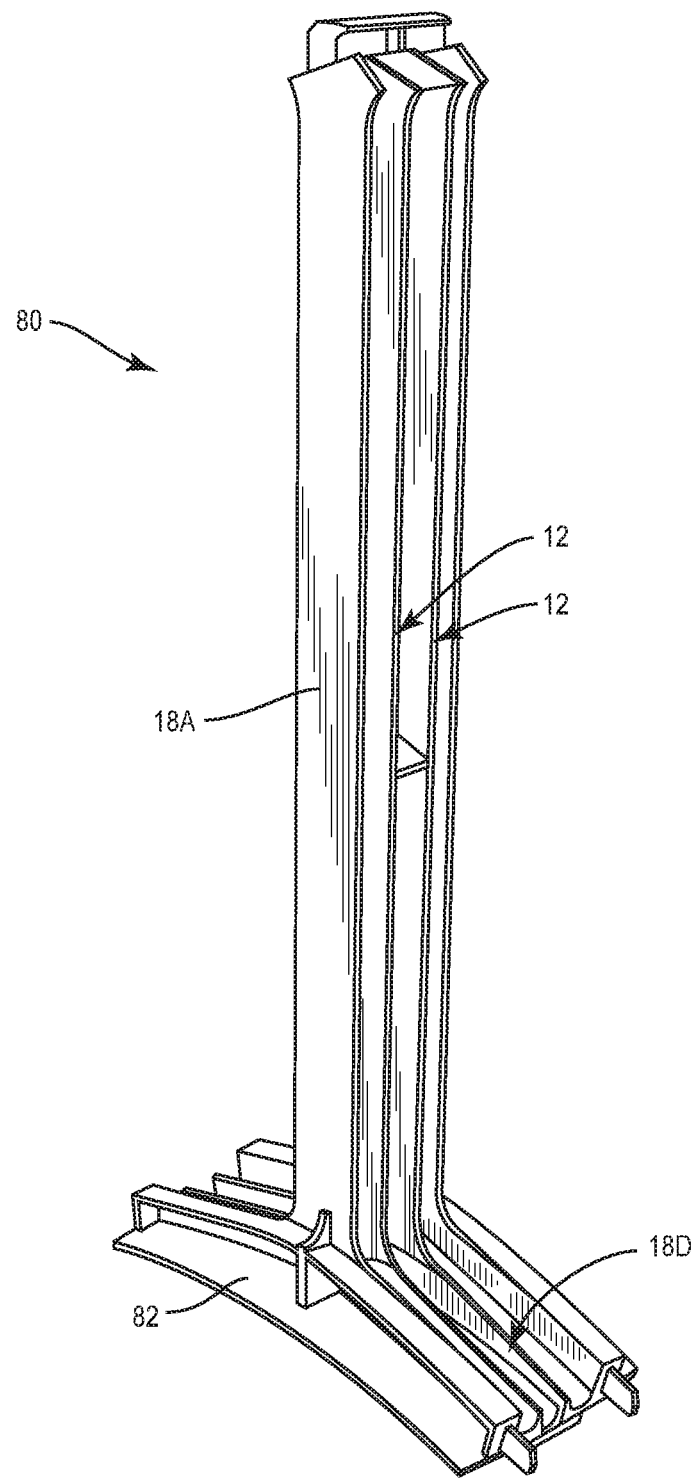
FIG. 3 is a perspective view of a filter frame module having the backwash guides incorporated therein.

In some embodiments, the filter frame 18 is modular and is constructed of interchangeable modules. The modules can be constructed of plastic or other suitable materials. With reference to FIG. 3, there is shown therein one of the modules 80 employed in the filter frame 18 shown in FIG. 1. In this example, the module 80 is constructed of plastic and includes a base 82. Bases 82 of the modules form the inner periphery 18B of the filter frame 18. Note that the bases 82 are interconnected in back-to-back relationship and secured around and to the drum 40. Each base 82 includes openings on opposite sides. These openings form openings 18D in the inner periphery 18B of the filter frame. Extending upwardly from the bases 82 are the support arms 18A that has been discussed above. As seen in FIG. 1, outer covers 86 are interconnected between adjacent modules 80. Thus, the modules 80, along with the outer covers 86, form the filter frame 18 shown in FIG. 1.

Formed on opposite sides of each module 80 is a pair of filter grooves. These filter grooves receive the surrounding frames of respective filter segments 20. A seal can be interposed between the filter segments 20 and the filter grooves.

FIG. 3 depicts one way in which the backwash guides 12 can be incorporated into the modules 80. Note that a pair of backwash guides 12 extends along a leading side of the support arms 18A of the modules 80. In particular, each backwashing guide 12 is integrally formed with a portion of the support arms 18A and projects slightly inwardly therefrom in the manner illustrated in FIG. 2. Therefore, on the leading side of each support arm 18A there is provided a pair of backwash guides 12 that extend over a substantial length of the support arms 18A. Note that these backwash guides 12, in conjunction with the modules 80 and the filter segments 20, also form a pair of backwash channels 22 on leading sides of the support arms. Backwash channels 22 include inner terminal ends that terminate adjacent the openings in the bases 82. Thus as described above, during a backwashing operation backwash channels 22 function to guide and direct a mixture of backwash and suspended solids to the openings formed in the bases 82 of the modules 80. And like discussed above, the openings in the bases 82 are aligned with openings 40A of the drum 40 and hence the backwash and suspended solids mixture passing from the openings in the bases 82 flows through the openings 40A into the underlying solids trough 14.

Figure 1B:
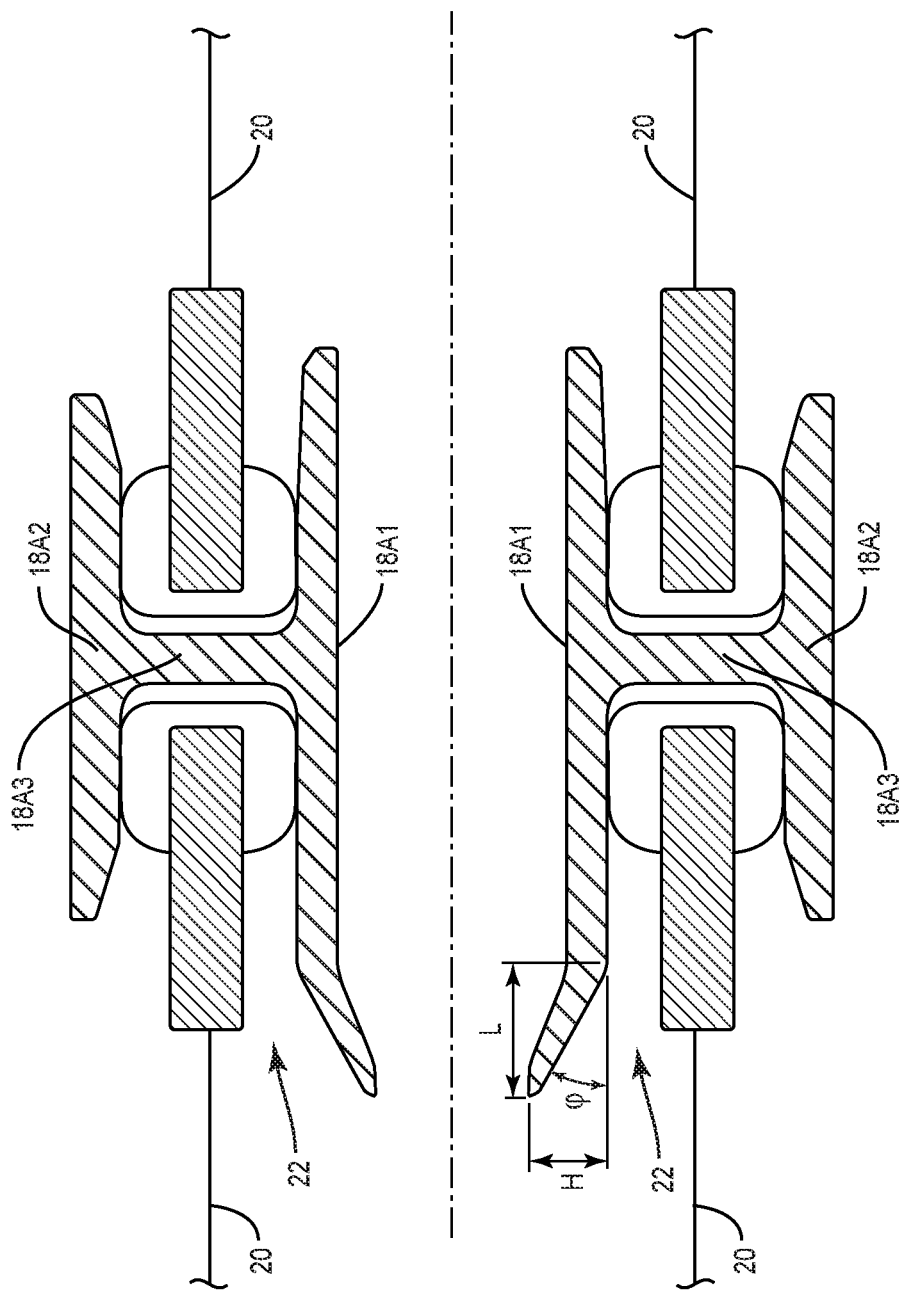
FIG. 1B shows a portion of FIG. 1A and identifies the location of dimension and angle indicators L, H and cp.

The volume and dimensions of the backwash channels 22 can vary. This is especially the case because the width of the filter disc 16 varies from one disc filter to another. FIG. 1B uses L, H and φ to denote dimensions and an angle relative to the backwash guides 12. Again, the length of L and H, as well as the angle φ, will vary. However, in exemplary embodiments, L would typically be 5-85 mm, H 3-40 mm, and φ 2°-83°.

Figure 6:
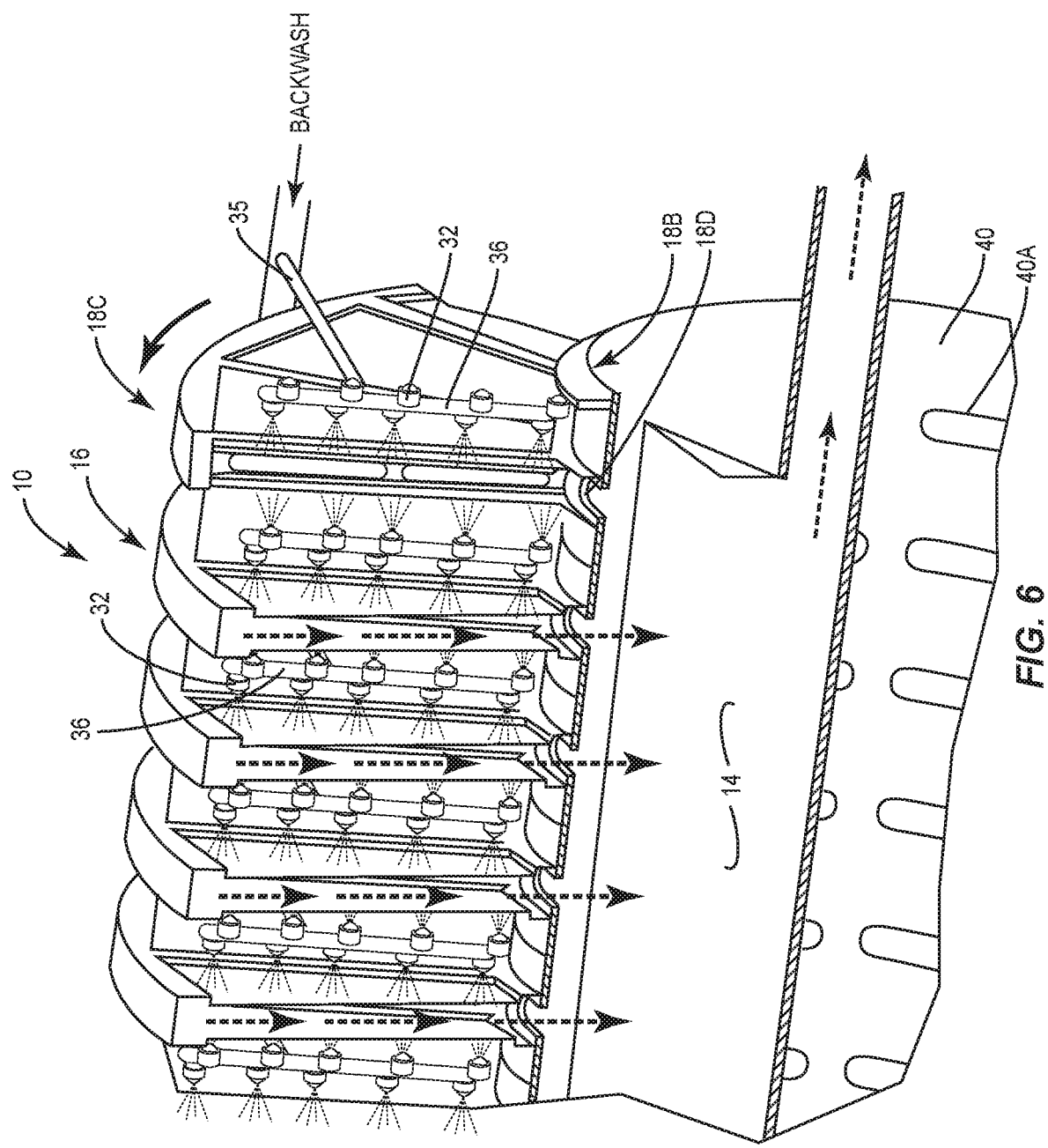
FIG. 6 is a fragmentary perspective view of a portion of the disc filter which illustrates how the backwash guides facilitate the removal of a backwash and suspended solids mixture from the filter disc.

FIG. 6 illustrates how the backwash guides 12 and the backwash channels 22 facilitate the recovery of the backwash and suspended solids mixture and how they guide and direct the mixture into the solids trough 14. The flow of the backwash and suspended solids mixture is shown by heavy dotted lines and arrows in FIG. 6. FIG. 6 does not show the backwash channels 22. The dotted lines and arrows are meant to simply represent the flow of the backwash and suspended solids mixture through the respective filter discs 16. Note also in FIG. 6 where the flow of the mixture passes through openings 18D in the inner periphery of the filter frame and from there through the array of openings 40A formed in the drum and then into the underlying solids trough 14.

Figure 4:
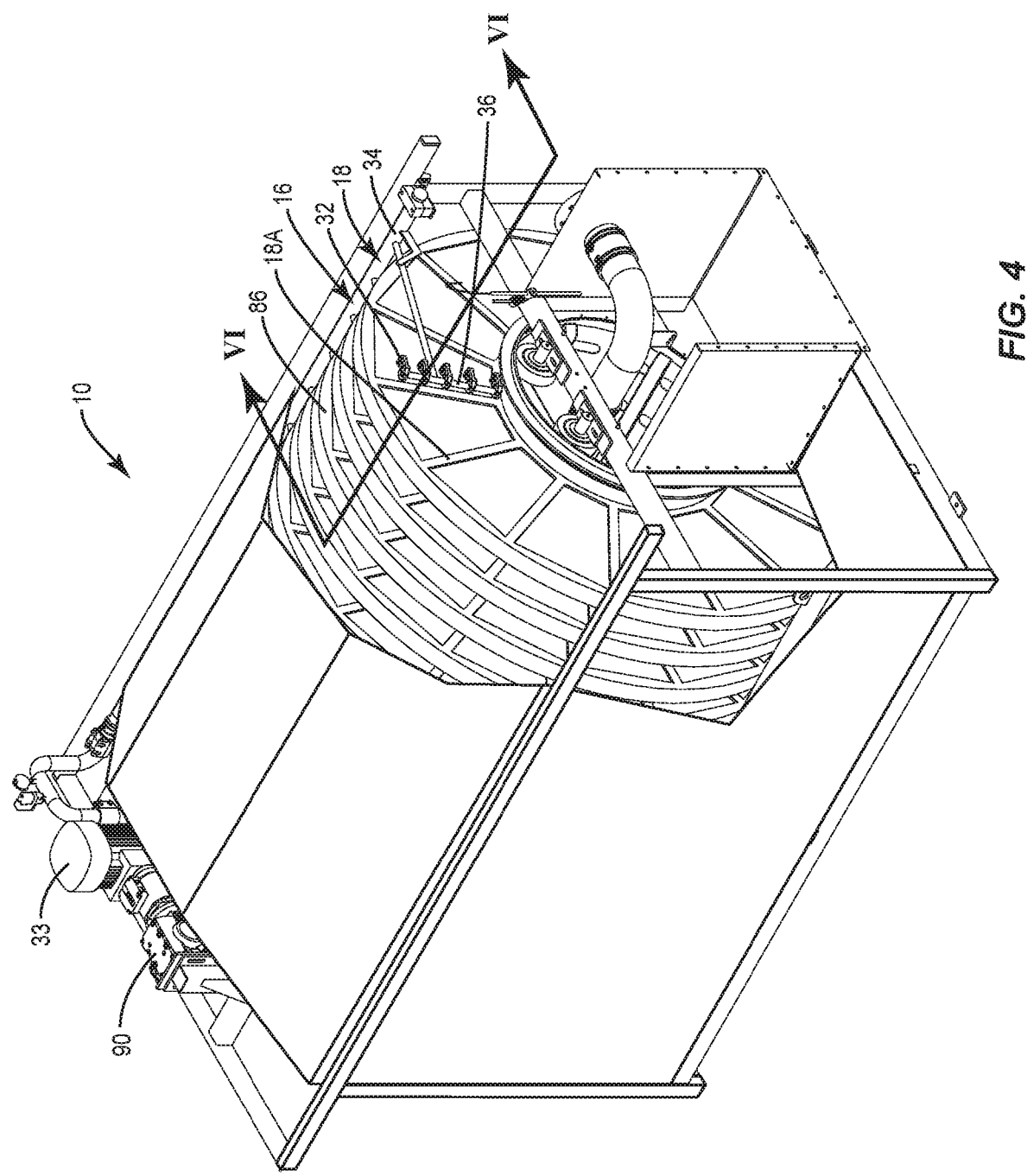
FIG. 4 is a perspective view of the disc filter with portions broken away to better illustrate certain components of the disc filter.
Figure 5:
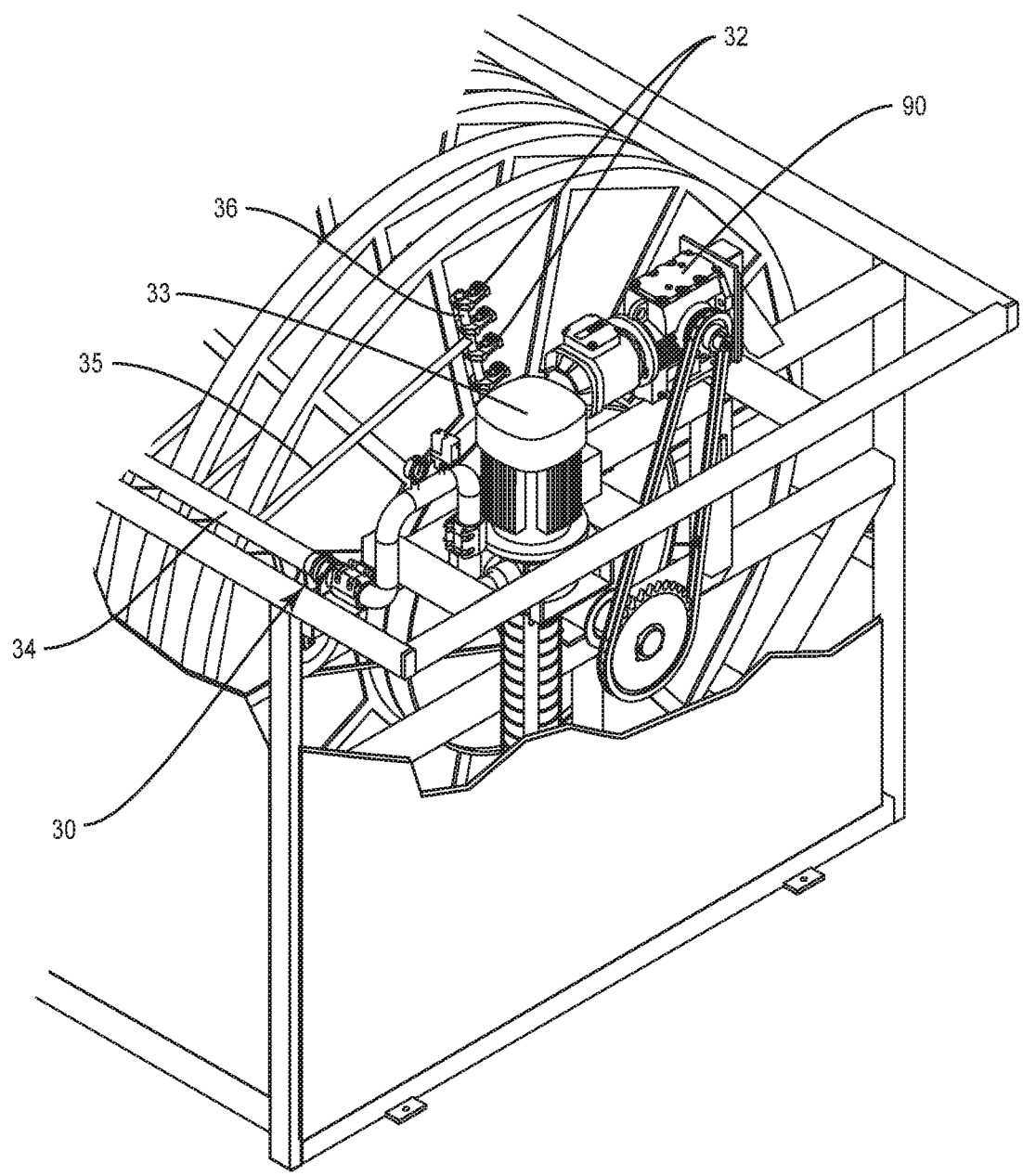
FIG. 5 is a perspective view of a rear portion of the disc filter with portions broken away to better illustrate certain components of the disc filter.

The filter discs 16, drum 40, along with the backwash guides 12 and the backwash channels 22 are incorporated into a disc filter 10. It may be beneficial to briefly review the basic design of an exemplary disc filter. The disc filter 10, shown in FIGS. 4 and 5, includes a housing. Some rotary disc filters (a second type) are not provided with a substantial housing structure. These disc filters are often referred to as frame-type disc filters as they are designed to be installed in a pre-formed concrete basin. There is yet a third type or version of a disc filter which includes a half tank or frame with a bottom and sides and which only reaches to about the center of the drum of the disc filter.

In any event, either type of disc filter is provided with a frame structure for supporting various components that make up the disc filter. In this regard, the drum 40 is rotatively mounted on the frame structure of the disc filter. Generally the drum 40 is closed except that it includes an inlet opening and the array of openings 40A discussed above. The filter discs 16 are secured to the drum 40 and rotatable therewith during a backwashing operation. During the filtering of water or liquid, influent water or liquid is directed into the inlet of the drum 40 and from the drum into the filter discs 16 secured on the drum. The number of filter discs 16 secured to the drum can vary. A water holding area is defined inside each filter discs 16 for receiving and holding water or liquid to be filtered by the disc filter 10. Head pressure associated with the influent liquid or water is effective to cause the water or liquid to flow outwardly from the filter discs 16 and through the filter segments 20. Water exiting the filter discs 16 is filtered water or filtrate. As discussed above, this results in suspended solids in the water or liquid being captured or retained on the inner surfaces of the filter segments 20.

Filtered water or liquid exiting the filter discs 16 is collected in a holding chamber that underlies the filter discs. This holding chamber or area includes an outlet that enables the filtered water or liquid to be discharged from the disc filter 10.

During the backwashing operation, it is necessary for the drum 40 and the filter discs 16 mounted thereon to rotate. Disc filter 10 is provided with a drive system for rotatively driving the drum 40 and the filter discs 16. In the case of the embodiment illustrated in FIGS. 4 and 5, mounted to a panel or wall structure about the back portion of the disc filter 10 is a drum motor 90 that is operative to drive a sprocket or sheave connected to a shaft on which the drum 40 is mounted. See FIG. 5. Various means can be operatively interconnected between the drum motor 90 and the sprocket or sheave for rotating the drum 40. In one example, a chain drive is utilized to drive a sprocket secured to the shaft that rotates the drum 40. Various other types of drive systems can be utilized to rotate the drum and the filter discs 16. In some cases, for example, there may be a direct drive on the drum shaft from a gear motor.

Returning to the backwash system 30 discussed above, the system comprises a backwash pump 33, a manifold 34 that extends along a side portion of the disc filter 10, and a series of feed tubes 35 connected to the manifold 34 and projecting inwardly therefrom. Feed tubes 35, sometimes referred to as inner pipes, project from the manifold 34 into areas between respective filter discs 16. Secured to the feed tubes 35 are a series of nozzle holders or nozzle bars 36. Nozzles 32 are mounted on the nozzle bars 38. In a preferred embodiment, the backwash pump 33 forms a part of the disc filter. In other embodiments, pressurized backwash can be provided from a source other than a backwash pump that forms a part of the disc filter 10.

Manifold 34 can be rigidly mounted or rotatively mounted along one side of the disc filter 10. In some cases, manifold 34 is operatively connected to a drive (not shown) that can be indirectly driven from the drum motor 90. In any event, the manifold 34, during a cleaning operation, can oscillate back and forth, which results in the nozzles 32 sweeping back and forth between the filter discs 16 so as to backwash particular areas of the filter segments 20 disposed on opposite sides of the filter discs 16. In other cases, the manifold 24 is rigidly mounted and does not oscillate back and forth during the backwashing operation.

There are many advantages to the backwash guides 12. They assure that a larger percentage of the backwash and suspended solids mixture end up in the solids trough 14. One measure of the effectiveness of the backwash guides 12 can be appreciated from examining what is referred to herein as "separation speed of suspended solids" (mg separated suspended solids/s). In order to determine the separation speed of suspended solids, the first step is to measure the flow of the backwash and suspended solids mixture being discharged by the disc filter 10. Secondly, a sample of the flow of the backwash and suspended solids mixture is taken and a total suspended solids (TSS) test is carried out which gives the concentration of suspended solids (mg/L) of the backwash and suspended solids mixture. The separation speed of the suspended solids is defined as the product of the flow and the suspended solids concentration. The employment of the backwash guides 12 will, in most cases, increase the separation speed of the suspended solids.

"Configured to" is used in this application. The term "configured to" means "designed to".

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of filtering a liquid and backwashing filter media in a rotary disc filter, comprising:
    directing the liquid into a rotary drum;
    directing the liquid from the rotary drum into one or more filter discs secured to the rotary drum and having filter media disposed on opposite sides of the filter disc;
    filtering the liquid and removing suspended solids from the liquid by directing the liquid from the filter disc outwardly through the filter media, causing at least some of the suspended solids in the liquid to be retained on an inner surface of the filter media;
    backwashing the filter media by:
    rotating the drum and the filter disc such that portions of the filter media are rotated into a position to be backwashed by nozzles disposed exteriorly of the filter disc;
    directing a backwash from the nozzles through the filter media and into the interior of the filter disc and in the process, dislodging at least some of the suspended solids retained on the inner surface of the filter media which gives rise to a backwash and suspended solids mixture in the filter disc;
    receiving the backwash and suspended solids mixture in a series of backwash channels disposed in the filter disc; and
    directing the backwash and suspended solids mixture through the backwash channels and from the backwash channels through openings in an inner periphery of the filter disc and through openings in the drum and into a solids trough disposed in the drum.

2. The method of claim 1 including backwashing the filter media as the drum, filter disc and backwash channels are rotated; and as the drum, filter disc and backwash channels are rotated, sweeping the backwash and suspended solids mixture into the backwash channels.

3. The method of claim 1 wherein, as the filter disc is rotated, leading portions of the backwash channels are open in the direction of travel.

4. The method of claim 1 wherein there is provided a series of backwash guides that form a part of the backwash channels.

5. A rotary disc filter for filtering liquid comprising:
    a rotary drum for receiving the liquid and having a plurality of openings formed in a surface thereof;
    a solids trough disposed in the drum and configured to receive a backwash and suspended solids mixture;
    one or more filter discs secured to the drum and configured to receive liquid from the drum and filter the liquid as the liquid flows outwardly from the filter disc through filter media forming a part of the filter disc;
    the filter disc including a plurality of openings formed in an inner periphery of the filter disc;
    a backwashing system for backwashing the filter media and including a plurality of nozzles disposed exteriorly of the filter disc and configured to direct a backwash through the filter media and into the filter disc where the backwash dislodges suspended solids retained on the filter media;
    a drive for rotatively driving the drum and filter disc during a backwashing operation;
    a plurality of backwash guides disposed in the filter disc and configured to engage the backwash and suspended solids mixture during the backwashing operation and to guide the backwash and suspended solids mixture to the openings formed in the inner periphery of the filter disc after which the backwash and suspended solids flow through the openings in the drum and into the solids trough;
    the backwash guides spaced inwardly from the filter media such that open spaces are defined between the backwash guides and the filter media; and
    wherein the defined open spaces are disposed between the backwash guides and the filter media and are configured such that during the backwashing operation the backwash and the suspended solids mixture flows through the open spaces and through the filter disc to the openings formed in the inner periphery of the filter disc.

6. The rotary disc filter of claim 5 wherein the backwash guides are angled away from the filter media.

7. The rotary disc filter of claim 5 wherein the filter disc comprises a filter frame and a series of filter segments supported in the filter frame and wherein the backwash guides and the filter segments form the open spaces that extend interiorly within the filter disc.

8. The rotary disc filter of claim 5 wherein the backwash guides disposed in the filter disc include pairs of backwash guides that are transversely aligned and include terminal edges that terminate in spaced apart relationship with respect to each other.

9. The rotary disc filter of claim 5 wherein the filter disc comprises a filter frame and a plurality of filter segments supported in the filter frame; and wherein the backwash guides are secured to or integrally formed with the filter frame and project therefrom into the filter disc.

10. The rotary disc filter of claim 5 wherein the open spaces form at least a part of a series of backwash channels that extend through the filter disc, the backwash channels having an open side that faces the direction of travel of the filter disc during the backwashing operation.

11. The rotary disc filter of claim 10 wherein the backwash channels extend between an outer periphery of the filter disc and the inner periphery of the filter disc, and wherein the backwash channels include inner end portions that terminate adjacent the openings in the inner periphery of the filter disc.

12. A rotary disc filter for filtering a liquid comprising:
    a rotary drum for receiving the liquid and having a plurality of openings formed in a surface thereof;

a solids trough disposed in the drum and configured to receive a backwash and suspended solids mixture;

one or more filter discs secured to the drum and configured to receive liquid from the drum and filter the liquid as the liquid flows outwardly from the filter disc through filter media forming a part of the filter disc;

the filter disc including a plurality of openings formed in an inner periphery of the filter disc;

a drive for rotatively driving the drum and causing the filter disc to rotate with the drum;

a backwash system for backwashing the filter media and including a plurality of nozzles disposed exteriorly of the filter disc and configured to direct the backwash through the filter media and into the filter disc where the backwash dislodges suspended solids from the filter media and a backwash and suspended solids mixture is formed;

a plurality of backwash guides that project inwardly from opposite sides of the filter disc into the interior of the filter disc;

the backwash guides and a portion of the filter disc form a series of backwash channels that extend through the filter disc;

wherein the backwash channels extend generally toward the openings in the inner perimeter of the filter disc; and wherein in a backwashing operation, the backwash channels are configured to receive at least a portion of the backwash and suspended solids mixture and to direct the backwash and the suspended solids to the openings in the inner perimeter of the filter disc where the backwash and suspended solids pass through the openings in the drum and into the solids trough.

13. The rotary disc filter of claim 12 wherein the backwash guides include terminal edges that terminate intermediately between opposite sides of the filter disc.

14. The rotary disc filter of claim 12 wherein the backwash guides projecting from one side of the filter disc are transversely aligned with backwash guides projecting from the other side of the filter disc.

15. The rotary disc filter of claim 14 wherein the transversely aligned backwash guides are spaced apart such that an open area is defined between the transversely aligned backwash guides.

16. The rotary disc filter of claim 12 wherein the backwash channels extend generally between the outer and inner peripheries of the filter disc, and wherein the backwash channels include inner end portions and wherein the inner end portions of the backwash channels terminate adjacent the openings in the inner periphery of the filter disc.

17. The rotary disc filter of claim 12 wherein the backwash channels are disposed in pairs with the pairs of backwash channels being transversely aligned and circumferentially spaced around the filter disc.

18. The rotary disc filter of claim 12 wherein the filter disc comprises a filter frame that supports the filter media on opposite sides thereof; and wherein the backwash guides are secured to or integrally formed with the filter frame and project inwardly therefrom into the filter disc.

19. The rotary disc filter of claim 18 wherein the filter media comprises a series of filter segments supported in the filter frame and wherein the filter segments and the filter frame form a series of compartments around the filter disc; and wherein the backwash guides and the backwash channels are formed on leading edges of the compartments.

20. The rotary disc filter of claim 12 wherein the backwash guides that project from opposite sides of the filter disc include elongated edges that angle inwardly with respect to the filter media.

21. A rotary disc filter for filtering liquid comprising:
a rotary drum for receiving the liquid and having a plurality of openings formed in a surface thereof;
a solids trough disposed in the drum and configured to receive a backwash and suspended solids mixture;
one or more filter discs secured to the drum and configured to receive the liquid from the drum and to filter the liquid as the liquid flows outwardly from the filter disc through filter media forming a part of the filter disc;
the filter disc including a filter frame;
a drive for rotatively driving the drum and causing the filter disc to rotate with the drum during a backwashing operation;
a plurality of circumferentially spaced backwash guides projecting from the filter frame into the interior of the filter disc and configured to engage the backwash and suspended solids mixture and facilitate the movement of the backwash and suspended solids mixture into the solids trough;
the backwash guides being angled relative to an adjacent side of the filter disc and projecting in the general direction of rotation of the filter disc during a backwashing operation; and
the backwash guides including elongated edges that terminate intermediately between opposite sides of the filter disc.

22. The rotary disc filter of claim 21 wherein the backwash guides form a part of a plurality of backwash channels configured to direct or channel the backwash and suspended solids mixture through the filter disc.

23. The rotary disc filter of claim 21 wherein the backwash guides are disposed in pairs within the filter disc and wherein each pair of backwash guides are transversely aligned and project inwardly towards each other where the elongated edges terminate in spaced apart relationship to form an opening between transversely aligned backwash guides.

24. The rotary disc filter of claim 21 wherein the filter frame includes a plurality of circumferentially spaced support arms and wherein the backwash guides project from a leading side of the support arms.

25. The rotary disc filter of claim 21 wherein the backwash guides are spaced inwardly from the filter media.

* * * * *